US006599217B2

(12) United States Patent
Caringella et al.

(10) Patent No.: US 6,599,217 B2
(45) Date of Patent: Jul. 29, 2003

(54) LIMITED SLIP DIFFERENTIAL

(75) Inventors: Anthony R. Caringella, Norridge, IL (US); James A. Gruszkowski, Orland Park, IL (US); Wesley P. Nowakowski, Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/014,271

(22) Filed: Nov. 9, 2001

(65) Prior Publication Data

US 2003/0092527 A1 May 15, 2003

(51) Int. Cl.[7] .............................................. F16H 48/06
(52) U.S. Cl. ..................................... 475/220; 475/252
(58) Field of Search ............................... 475/220, 221, 475/248, 249, 252

(56) References Cited

U.S. PATENT DOCUMENTS

| 2,696,125 A | | 12/1954 | Saari | |
|---|---|---|---|---|
| 3,292,456 A | | 12/1966 | Saari | |
| 3,375,736 A | * | 4/1968 | Saari | 475/160 |
| 3,406,593 A | | 10/1968 | Vesey | |
| 3,631,736 A | | 1/1972 | Saari | 74/462 |
| 4,791,832 A | * | 12/1988 | McCaw | 475/226 |
| 5,616,096 A | * | 4/1997 | Hagiwara | 475/249 |
| 6,010,424 A | * | 1/2000 | Irwin | 475/231 |

OTHER PUBLICATIONS

Rohregger, et al. "Advanced Development of Self–Controlled Torque Sensitive Limited–Slip Differential by Means of Helical Gears", SAE Technical Paper Series, 1994, pp. 934–941.
Warren, Andrew, "What's Limited Slip", Publication in PCA Editor's Digest & December Spiel, 1 pg.
ITW Spiroid, "Concurve Gears and Gear Systems, Design Manual No. 1", 34 pgs.
ITW Spiroid, "Spiroid Gearing Design Manual No. 6", 54 pgs.

* cited by examiner

Primary Examiner—Sherry Estremsky
Assistant Examiner—Tisha D. Lewis
(74) Attorney, Agent, or Firm—Donald J. Breh; Mark W. Croll; Paul F. Donovan

(57) ABSTRACT

A limited slip differential having a carrier with a plurality of recesses disposed symmetrically relative to a gear opening. The gear opening having a gear diameter, and each of the plurality of recesses having a recess diameter. The gear diameter intersecting the recess diameter of each of the plurality of recesses at corresponding first and second intersections, an acute angle between a line tangent to the recess diameter at the first intersection and a tangent line of the recess diameter along which first and second chamfers extend is between approximately 30 degrees and approximately 32 degrees.

20 Claims, 4 Drawing Sheets

LIMITED SLIP DIFFERENTIAL

BACKGROUND OF THE INVENTIONS

The invention relates generally to differentials, and more particularly to limited slip differentials.

Limited slip differentials are known generally and employed commonly in rear wheel and center differentials, among many other applications.

U.S. Pat. No. 3,292,456 entitled "Spin Limiting Differential", assigned commonly herewith, for example, discloses a rotatable carrier having a plurality of open-sided bores with a corresponding plurality of planetary gears disposed symmetrically therein about a rotation axis of the carrier. A portion of each planetary gear protrudes from the open side of the corresponding bore and is coupled to a drive shaft, or axle. Friction between the planetary gears and the carrier bores limits the slip of the differential.

An object of the present invention is to provide novel limited slip differentials that improve upon and overcome problems in the art.

Another object of the invention is to provide novel limited slip differentials that are economical.

A further object of the invention is to provide novel limited slip differentials having improved reliability.

Still another object of the invention is to provide novel limited slip differentials that produce less noise.

Yet another object of the invention is to provide novel limited slip differentials having improved performance.

A more particular object of the invention is to provide novel limited slip differentials comprising a carrier having a plurality of recesses disposed therein about a rotation axis thereof, each recess having an open side portion with opposite first and second edges, a chamfer disposed in the recess along each of the first and second edges thereof, and a planetary gear disposed in each of the plurality of carrier recesses having a portion protruding from the open side portion thereof.

Another more particular object of the invention is to provide novel limited slip differentials comprising a carrier having a plurality of recesses disposed about a sun gear opening, the sun gear opening having a sun gear diameter, and each of the plurality of recesses having a recess diameter. Each of the plurality of recesses having a circular portion, an opening, and first and second chamfers extending along tangents of the recess diameter on first and second sides of the recess toward the opening thereof. The sun gear diameter intersecting the recess diameter of each of the plurality of recesses at corresponding first and second intersections, an acute angle between a line tangent to the recess diameter at the first intersection and the first chamfer between approximately 30 degrees and approximately 32 degrees, and an acute angle between a line tangent to the recess diameter at the second intersection and the second chamfer between approximately 30 degrees and approximately 32 degrees.

Another more particular object of the invention is to provide novel limited slip differentials comprising a carrier having a plurality of recesses disposed symmetrically relative to a gear opening. The gear opening having a gear diameter, and each of the plurality of recesses having a recess diameter. Each of the plurality of recesses having a circular portion, an opening, and first and second chamfers extending along tangents of the recess diameter on first and second sides of the recess toward the opening thereof. The gear diameter intersecting the recess diameter of each of the plurality of recesses at corresponding first and second intersections, an acute angle between a line tangent to the recess diameter at the first intersection and the first chamfer between approximately 30 degrees and approximately 32 degrees, and an acute angle between a line tangent to the recess diameter at the second intersection and the second chamfer between approximately 30 degrees and approximately 32 degrees.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTIONS

Figure 1:
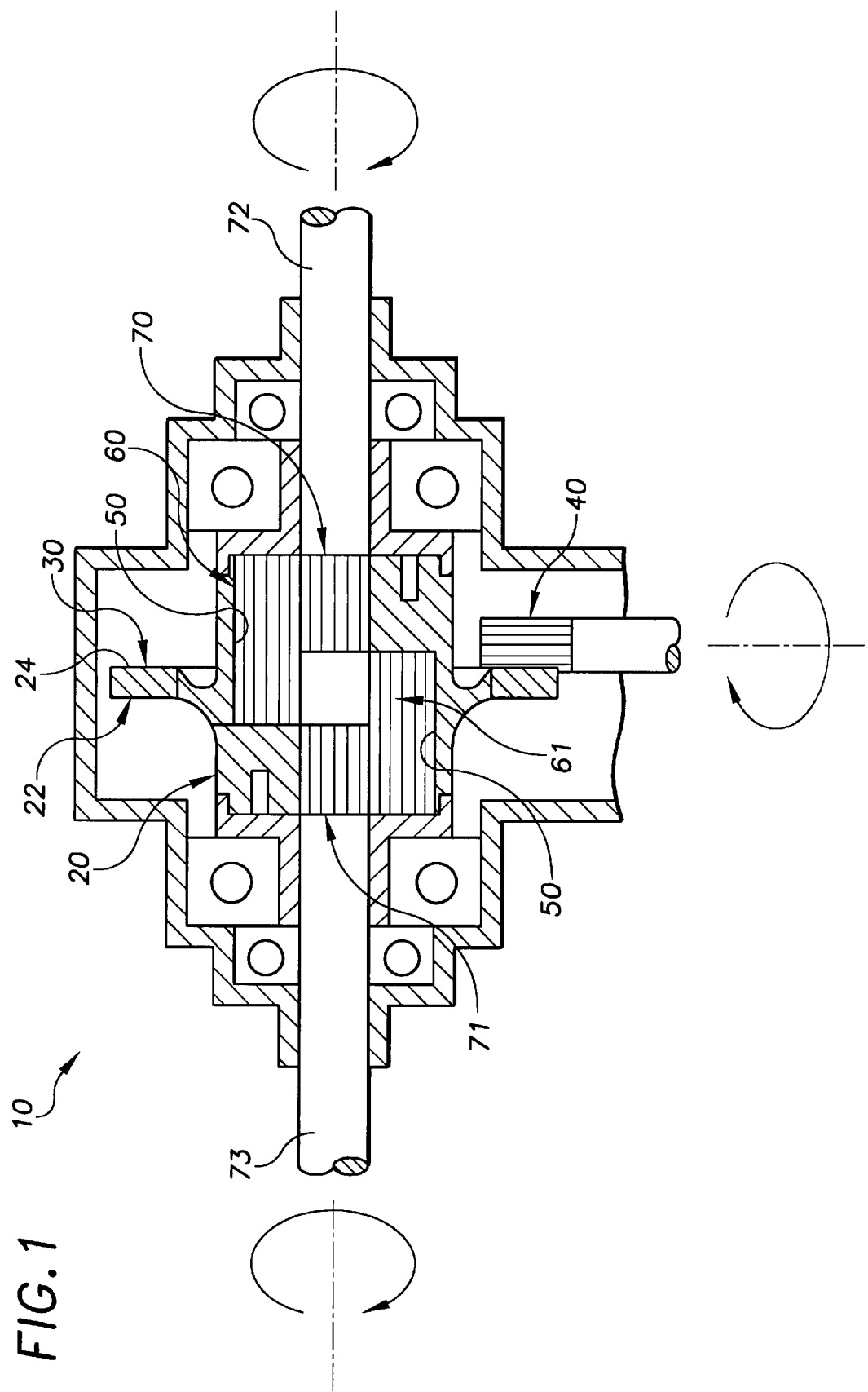
FIG. 1 is a limited slip differential according to an exemplary embodiment of the invention.

FIG. 1 illustrates a limited slip differential 10 generally comprising a carrier 20 having a radial flange 22 disposed about a rotation axis thereof.

The radial flange 22 generally comprises a skew axis geared surface thereon for engagement with a pinion coupled to an output of a motor or other rotary drive member.

Figure 2:
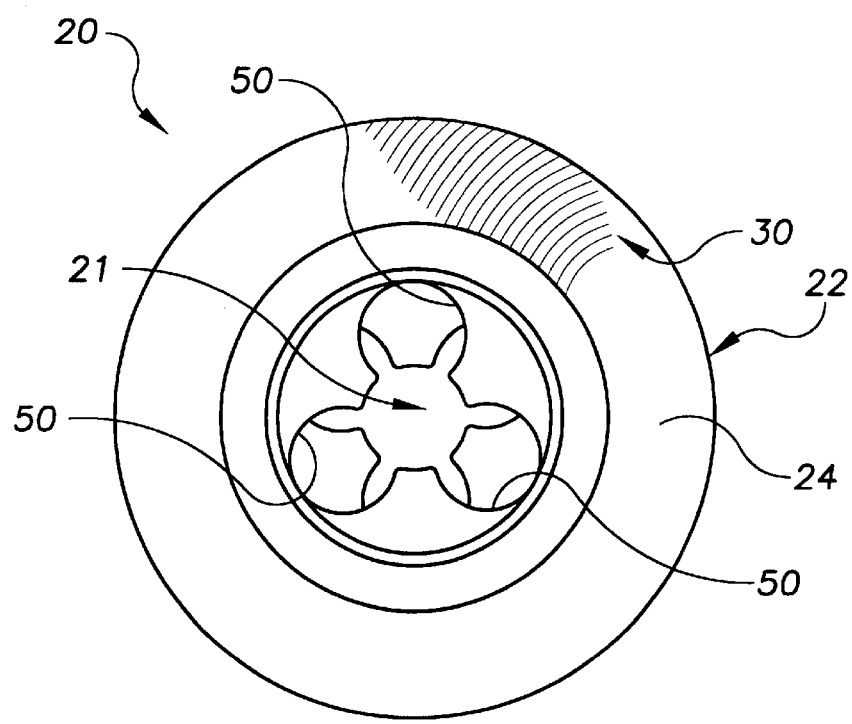
FIG. 2 is a first exemplary carrier configuration.

In the exemplary embodiment of FIGS. 1 and 2, the skew axis geared surface is a gear face 30 disposed on a first side 24 of the radial flange 22 about the rotation axis. The exemplary pinion 40 and face gear 30 preferably comprise teeth having different pressure angles, for example HELICON or SPIROID gear forms by ITW Spiroid, Glenview, Ill.

In alternative embodiments, the pinion and geared surface of the carrier may have other known gear configurations, for example a bevel or worm gear form, or a HYPOID gear form.

The carrier also generally comprises a first plurality of open-sided recesses disposed symmetrically about the carrier rotation axis on a first side thereof, and a second plurality of open-sided recesses disposed symmetrically about the carrier rotation axis on an opposite second side thereof.

A planetary gear having a rotation axis parallel to the carrier rotation axis is disposed in each of the plurality of recesses on the first and second sides of the carrier. Portions of the planetary gears protruding from the open side portions of the first plurality of recesses are engaged with a first gear on the first side of the carrier, and portions of the planetary gears protruding from the open side portions of the second plurality of recesses are engaged with a second gear on the second side of the carrier.

In the exemplary embodiment of FIG. 2, the plurality of open-sided recesses 50 are configured on each of the first and second sides of the carrier 20 so that planetary gears disposed therein engage a centrally located sun gear, a portion of which may be rotatably disposed in a corresponding portion of an axial opening 21 through the carrier.

FIG. 1 illustrates portions of one of the planetary gears 60 and 61 on the first and second respective sides of the carrier 20 engaged with corresponding sun gears 70 and 71, which are formed on or are portions of corresponding axles 72 and 73 having rotation axes aligned with the carrier rotation axis.

The planetary gears may be spur gears having an involute profile or preferably a modified involute profile, or some other gear form.

Figure 3:
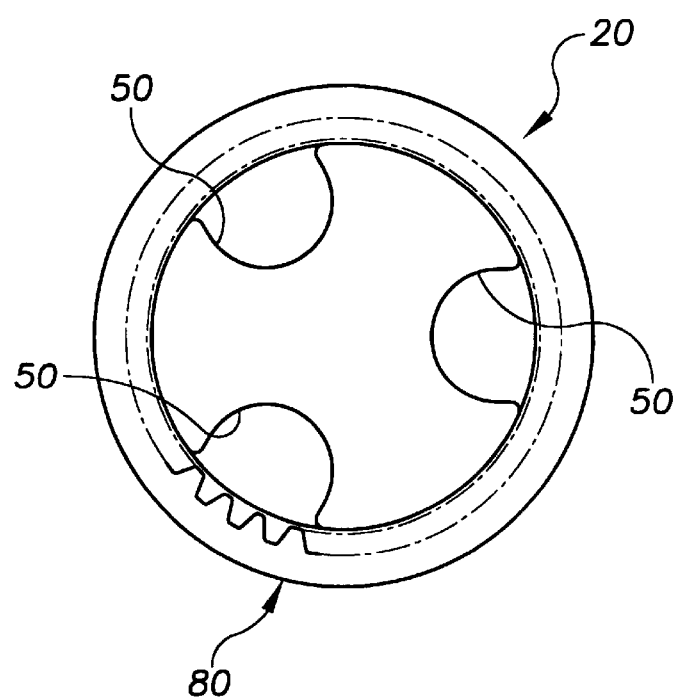
FIG. 3 is a second exemplary carrier configuration.

In the exemplary embodiment of FIG.3, which illustrates only a portion of the carrier 20 on one side thereof, the plurality of open-sided recesses 50 are configured on each of the first and second sides of the carrier so that planetary gears disposed therein engage a ring gear 80 having a rotation axis aligned with the carrier rotation axis. The ring gear 80 is disposed about the plurality of recesses 50, and portions of the planetary gears, not shown, protruding from the open side portions of the recesses engage the ring gear 80.

The engagement of planetary gears with central sun gears or with outer ring gears is known generally, as disclosed more fully in U.S. Pat. No. 3,292,456 entitled "Spin Limiting Differential", assigned commonly herewith and incorporated herein by reference.

Figure 4:
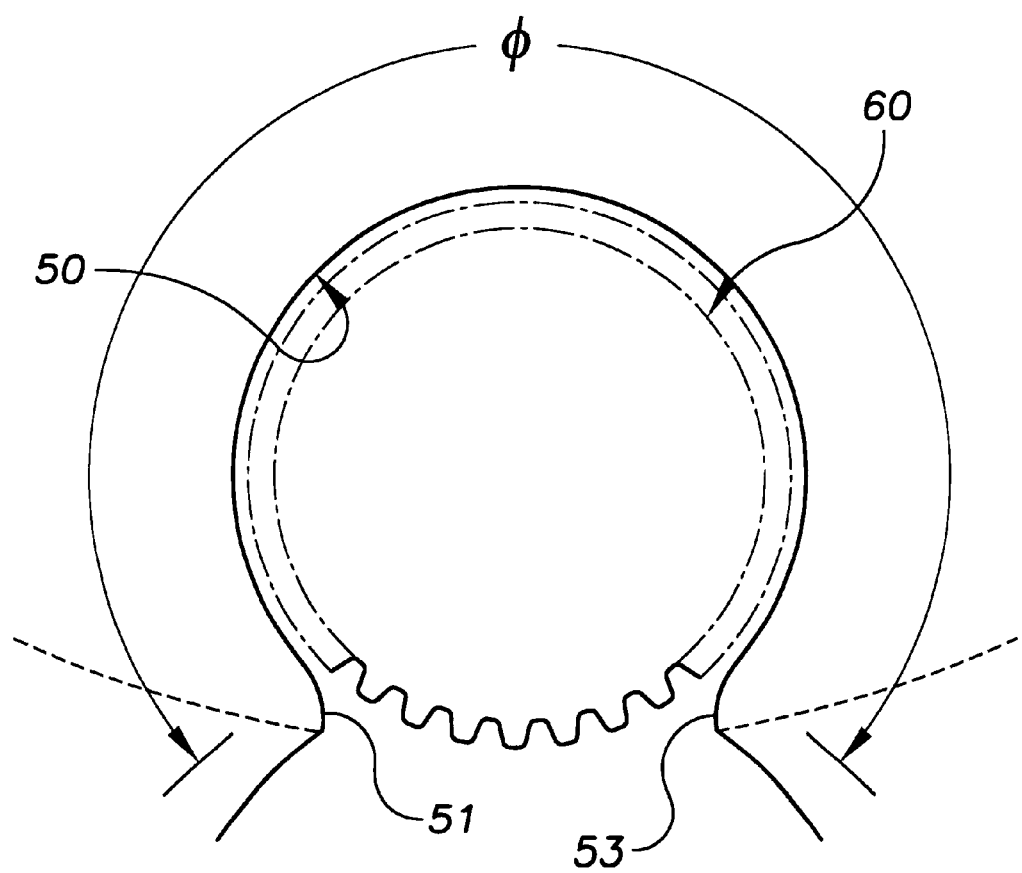
FIG. 4 is a partial detail view of a carrier recess.

The open-sided recesses 50 of the carrier, only one of which is illustrated in FIG. 4, each have generally opposite first and second edges on the open side thereof, substantially parallel to the carrier rotation axis. In each recess, along the first and second edges of the opening thereof, are disposed corresponding chamfers 51 and 53. A portion of the planetary gear 60 protrudes from the open side portion of the corresponding recess 50.

Each of the planetary gears is frictionally engageable with a circumferential portion of the corresponding recess, thus limiting the slip of the differential. In FIG. 4, at least a portion of the chamfers 51 and 53 of the recess does not contact the adjacent portions of the planetary gear 60 disposed therein, thus providing tapered lead-in portions along the first and second edges at the opening of the recess. The chamfers 51 and 53 preferably provide a relatively continuous transition between the portion of the recess that contacts the planetary gears and the portions of the recess that do not contact the planetary gears.

The circumferential portion of the recess that engages the corresponding planetary gear is selected so that the recess provides adequate support for the planetary gear rotating therein and at the same time does not bind the gear. Binding causes excessive wear and undesirable noise and vibration, and may be eliminated or substantially reduced by providing appropriately tapered lead-in portions with the chamfers, as discussed above.

In one differential application, the circumferential portion of the recess contactable with the planetary gear 60 has an angle φ between approximately 313 degrees and approximately 315 degrees. This range of angles however is only exemplary and maybe more or less depending on the requirements of the particular application.

Figure 5:
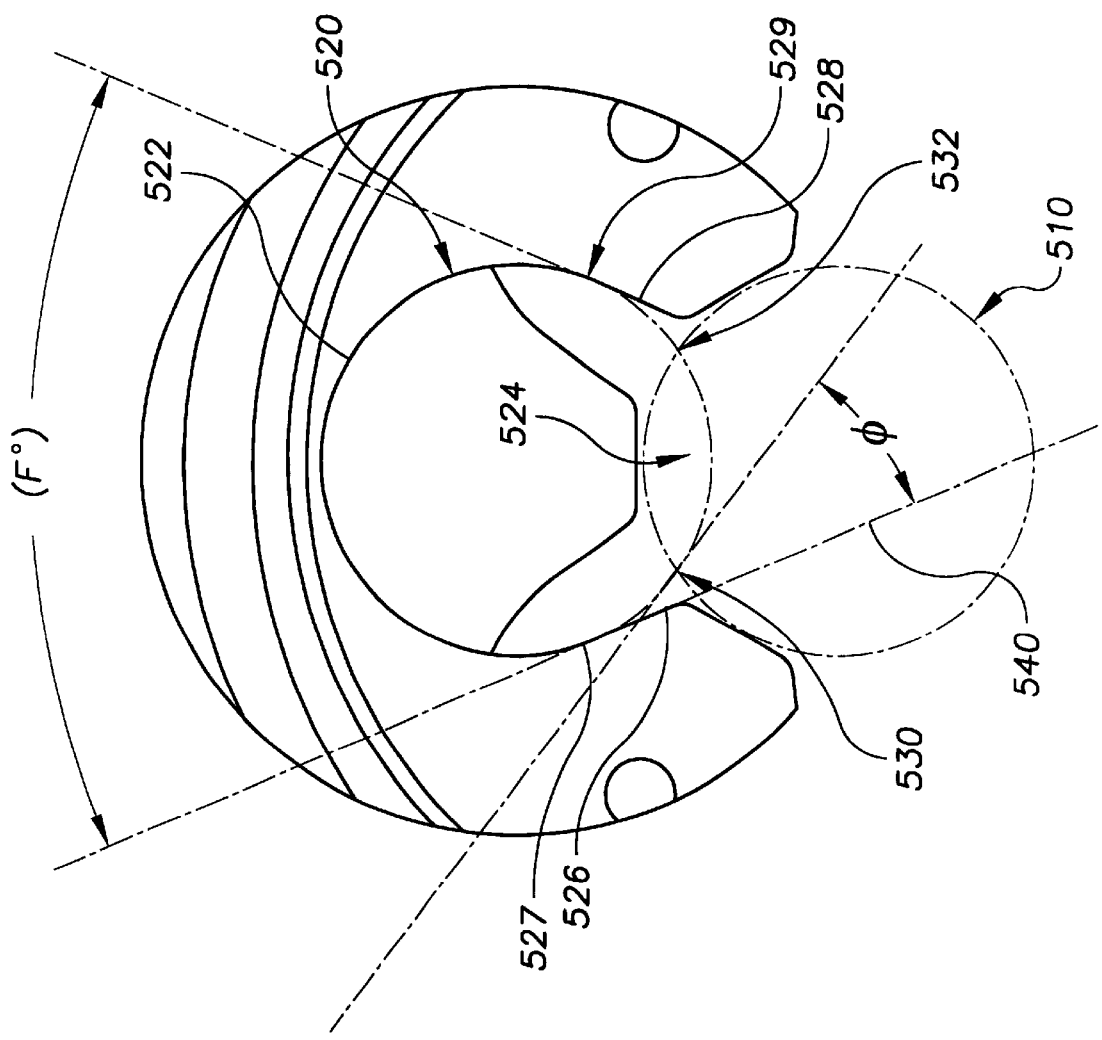
FIG. 5 is a partial view of an exemplary carrier portion.

FIG. 5 illustrates a partial view of a portion of a carrier, and more particularly a planetary gear recess thereof and a sun gear opening with parallel axes as discussed generally above. According to this aspect of the invention, the sun gear opening has a sun gear diameter 510, and each of the plurality of recesses (only one of which is illustrated) has a corresponding recess diameter 520.

In FIG. 5, each of the plurality of recesses has a circular portion 522, and an opening, identified generally by numeral 524, merging into the sun gear opening. Each of the plurality of recesses also include first and second chamfers 526 and 528 extending along corresponding tangents of the recess diameter on first and second sides of the recess toward the opening thereof. In the exemplary embodiment, the first and second chamfers 526 and 528 of each of the plurality of recesses extend from tangents at opposite ends 527and 529 of the circular side portion thereof toward the corresponding sun gear opening.

In FIG. 5, the sun gear diameter 510 intersects the recess diameter 520 of each of the plurality of recesses at corresponding first and second intersections 530 and 532. In one embodiment, an acute angle φ between a line 540 tangent to the recess diameter 520 at the first intersection 530 and the tangent along which the first chamfer 526 extends is between approximately 30 degrees and approximately 32 degrees. Similarly, an acute angle between a line tangent to the recess diameter 520 at the second intersection 532 and the tangent along which the second chamfer extends is between approximately 30 degrees and approximately 32 degrees.

In an alternative embodiment, the sun gear is replaced with a ring gear, as discussed above, wherein the intersections 530 and 532 of FIG. 5 correspond instead to intersections of the ring gear diameter and the planetary gear diameters. The same angular relationship hold in this alternative embodiment. More particularly, an acute angle between a lines tangent to the recess diameter at the first and second intersections and the tangent along which the first and second chamfers extend is between approximately 30 degrees and approximately 32 degrees.

The gears of the exemplary transaxle are preferably fabricated using powder metal technology.

While the foregoing written description of the invention enables one of ordinary skill to make and use what is considered presently to be the best mode thereof those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A limited slip differential comprising:
   a carrier,
   the carrier having a plurality of recesses disposed about a sun gear opening,
   the sun gear opening having a sun gear diameter, each of the plurality of recesses having a recess diameter,
   each of the plurality of recesses having a circular portion, an opening, and first and second chamfers extending along tangents of the recess diameter on first and second sides of the recess toward the opening thereof,
   the sun gear diameter intersecting the recess diameter of each of the plurality of recesses at corresponding first and second intersections, an acute angle between a line tangent to the recess diameter at the first intersection and the first chamfer between approximately 30 degrees and approximately 32 degrees, and an acute angle between a line tangent to the recess diameter at the second intersection and the second chamfer between approximately 30 degrees and approximately 32 degrees.

2. The differential of claim 1, the first and second chamfers extending from opposite ends of the circular portion of each of the corresponding recesses, the opening of each of the plurality of recesses emerging into the sun gear opening.

3. The differential of claim 2, the plurality of recesses are planetary gear openings, a planetary gear disposed in each of the plurality of planetary gear openings engaged with a sun gear disposed in the sun gear opening, the plurality of planetary gears having a rotation axis parallel to a rotation axis of the sun gear.

4. The differential of claim 3, at least a portion of the first and second chamfers of each of the plurality of recesses contactable with the corresponding planetary gear therein.

5. The differential of claim 1, a planetary gear disposed in each of the plurality of recesses engaged with a sun gear disposed in the sun gear opening, the plurality of planetary gears having a rotation axis parallel to a rotation axis of the sun gear.

6. The differential of claim 5, at least a portion of the first and second chamfers of each of the plurality of recesses contactable with the corresponding planetary gear therein.

7. The differential of claim 6, the carrier having a radial flange with a geared surface disposed thereon about the carrier rotation axis the geared surface on a face of the radial flange.

8. The differential of claim 5, each planetary gear frictionally engageable with the circular side portion of the corresponding recess, at least a portion of the first and second chamfers of the plurality of recesses not engageable with the corresponding planetary gear disposed therein.

9. The differential of claim 1, the circular portion of each of the plurality of recesses is a circular side portion opposite the opening of the corresponding recess, the first chamfer is a first side portion extending from a first end of the circular side portion, and the second chamfer is a second side portion extending from a second end of the circular side portion.

10. A limited slip differential comprising:
a carrier having a radial flange with a geared surface disposed about a rotation axis thereof;
the carrier having a first plurality of recesses disposed symmetrically about a first sun gear opening on a first side thereof and a second plurality of recesses disposed symmetrically about a second sun gear opening on an opposite second side thereof,
each of the first and second sun gear openings having a sun gear diameter, each of the plurality of recesses having a recess diameter,
each of the plurality of recesses having a circular side portion an open side portion, a first chamfer extending along a first tangent of the recess diameter on a first side of the recess toward the open side portion thereof, and a second chamfer extending along a second tangent of the recess diameter on a second side of the recess toward the open side portion thereof,
the sum gear diameter intersecting the recess diameter of each of the plurality of recesses at corresponding first and second intersections of the recess diameter and the sun gear diameter,
an acute angle between a line tangent to the recess diameter at the first intersection and the first chamfer between approximately 30 degrees and approximately 32 degrees, and an acute angle between a line tangent to the recess diameter at the second intersection and the second chamfer between approximately 30 degrees and approximately 32 degrees.

11. The differential of claim 10, a first sun gear in the first sun gear opening and a second sun gear in the second sun gear opening, a planetary gear disposed in each of the plurality of recesses,
portions of the planetary gears protruding from the open side portions of the first plurality of recesses engaged with the first sun gear, portions of the planetary gears protruding from the open side portions of the second plurality of recesses engaged with the second sun gear.

12. The differential of claim 11, each planetary gear frictionally engageable with the circular side portion of the corresponding recess, at least a portion of the first and second chamfers of the plurality of recesses not engageable With the corresponding planetary gear disposed therein.

13. The differential of claim 12, the first and second chamfers providing continuous transitions between the circular portions of the recesses engageable with the corresponding planetary gears and the portions of the first and second chamfers not engageable with the planetary gears.

14. The differential of claim 10, the first and second chamfers of each of the plurality of recesses extending from opposite ends of the circular side portion thereof toward the corresponding sun gear opening.

15. A limited slip differential comprising:
a carrier,
the carrier having a plurality of recesses disposed symmetrically relative to a gear opening,
the gear opening having a gear diameter, each of the plurality of recesses having a recess diameter,
each of the plurality of recesses having a circular portion, an opening, and first and second chamfers extending along tangents of the recess diameter on first and second sides of the recess toward the opening thereof,
the gear diameter intersecting the recess diameter of each of the plurality of recesses at corresponding first and second intersections, an acute angle between a line tangent to the recess diameter at the first intersection and the first chamfer between approximately 30 degrees and approximately 32 degrees, and an acute angle between a line tangent to the recess diameter at the second intersection and the second chamfer between approximately 30 degrees and approximately 32 degrees.

16. The differential of claim 15, the first and second chamfers extending from opposite ends of the circular portion of each of the corresponding recesses, the opening of each of the plurality of recesses emerging into the ring gear opening.

17. The differential of claim 15, the gear opening is a ring gear opening disposed about the plurality of recesses.

18. The differential of claim 17, the plurality of recesses are planetary gear openings, a planetary gear disposed in each of the plurality of planetary gear openings engaged with a ring gear disposed in the ring gear opening, the plurality of planetary gears having a rotation axis parallel to a rotation axis of the ring gear.

19. The differential of claim 18, at least a portion of the first and second chamfers of each of the plurality of recesses contactable with the corresponding planetary gear therein.

20. The differential of claim 19, the first and second chamfers extending from opposite ends of the circular portion of each of the corresponding recesses, the opening of each of the plurality of recesses emerging into the gear opening.

* * * * *